(12) United States Patent
Hsiao

(10) Patent No.: US 7,022,963 B2
(45) Date of Patent: Apr. 4, 2006

(54) LASER RECEIVER

(75) Inventor: Ching-Horng Hsiao, TaiChung (TW)

(73) Assignee: Quarton, Inc,, (TW)

( * ) Notice: Subject to any disclaimer, the term of this patent is extended or adjusted under 35 U.S.C. 154(b) by 51 days.

(21) Appl. No.: 10/838,946

(22) Filed: May 3, 2004

(65) Prior Publication Data

US 2005/0103974 A1 May 19, 2005

(30) Foreign Application Priority Data

Nov. 14, 2003 (TW) .............................. 92220157 U

(51) Int. Cl.
*G01C 21/00* (2006.01)
(52) U.S. Cl. ............... 250/206.1; 250/208.5; 356/4.06; 356/4.07; 356/623
(58) Field of Classification Search ............. 250/206.1, 250/206.2, 208.5; 356/4.06, 4.07, 4.01, 623
See application file for complete search history.

(56) References Cited

U.S. PATENT DOCUMENTS

| | | | | |
|---|---|---|---|---|
| 4,761,546 A * | 8/1988 | Ikari et al. | ................. | 356/3.04 |
| 4,769,533 A * | 9/1988 | Groschl et al. | .......... | 250/206.2 |
| 5,448,054 A * | 9/1995 | Massey | ................... | 250/206.1 |
| 6,308,428 B1 * | 10/2001 | Creighton, III | .............. | 33/286 |
| 6,337,473 B1 * | 1/2002 | Yamazaki et al. | ....... | 250/206.1 |
| 6,396,570 B1 * | 5/2002 | Takayanagi et al. | ....... | 356/5.01 |
| 6,747,266 B1 * | 6/2004 | Yamazaki et al. | .......... | 250/216 |
| 6,750,953 B1 * | 6/2004 | Douglas | .................... | 356/4.08 |

* cited by examiner

*Primary Examiner*—Stephone B. Allen
*Assistant Examiner*—Davienne Monbleau
(74) *Attorney, Agent, or Firm*—Raymond Sun

(57) ABSTRACT

A laser receiver for detecting the position of incidence of a beam of laser light thereon includes a first photodetector and a second photodetector aligned in series with each other and spaced apart from each other by a gap. If the laser is evenly distributed between the two photodetectors, then the laser position will be set as the correct position and a corresponding signal will be displayed. However, if the first photodetector detects more light than the second photodetector, then a signal will also be displayed to inform the user that more laser is being projected onto the first photodetector. On the other hand, if the second photodetector detects more light than the first photodetector, then a signal will be displayed to inform the user that more laser being projected onto the second photodetector. These signals will assist users to adjust the laser receiver to accurately position the laser.

6 Claims, 3 Drawing Sheets

LASER RECEIVER

BACKGROUND OF THE INVENTION

1. Field of the Invention

The present invention relates to a laser receiver, and more particularly, to a laser receiver for detecting the position of incidence of a beam of laser light thereon.

2. Description of the Prior Art

Laser technology has become very popular in recent times. Laser has major advantages due to its high power, monochromaticity, collimation, and coherence. Therefore, laser is generally used in research and development, medical treatment, communication, information, and other industrial areas, not only benefiting people, but also promoting the overall development of related industries.

Lasers are commonly being used for long-distance measurements, such as a level measurement which makes use of the specific frequency of the laser for positioning. A laser is emitted, and the position of the laser is inspected visually. Since the distance measured by such visual inspection in a levelling measurement can only cover about 10 meters, conventional lasers cannot carry out long-distance measurements effectively. Therefore, there remains a need for effectively extending the measuring distance of a laser, for example, to over 50 meters.

SUMMARY OF THE INVENTION

It is an object of the present invention to effectively extending the measuring distance of a laser.

It is another object of the present invention to provide a laser receiver for detecting the position of incidence of a beam of laser light thereon.

In order to achieve the objectives of the present invention, there is provided a laser receiver for detecting the position of incidence of a beam of laser light thereon. The laser receiver includes a first photodetector and a second photodetector aligned in series with each other and spaced apart from each other by a gap for detecting the radiation of the laser light to produce corresponding first and second current signals. Separate voltage converter circuits are coupled to the first and second photodetectors for separately receiving the first and second current signals and producing corresponding electronic signals. Separate band-pass filters are coupled to the two voltage converter circuits for filtering unnecessary electronic signals. A signal processing unit is coupled to the band-pass filters for amplifying and rectifying the electronic signals to produce corresponding first and second direct current voltage signals. A differential amplifier is coupled to the signal processing unit for producing a difference corresponding to the first and second direct current voltage signals. An absolute value circuit is coupled to the differential amplifier for producing an absolute difference corresponding to the difference. A compare circuit is coupled to the absolute value circuit for comparing the absolute difference with the sum of the two direct current voltage signals to produce a compare value. A microprocessor is coupled to the compare circuit for calculating the position of the laser light according to the compare value and then displaying the position of the laser light on a display unit.

If the laser is evenly distributed between the two photodetectors, then the laser position will be set as the correct position and a corresponding signal will be displayed. However, if the first photodetector detects more light than the second photodetector, then a signal will also be displayed to inform the user that more laser is being projected onto the first photodetector. On the other hand, if the second photodetector detects more light than the first photodetector, then a signal will be displayed to inform the user that more laser being projected onto the second photodetector. These signals will assist users to adjust the laser receiver to accurately position the laser.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The laser receiver of the present invention includes a first photodetector and a second photodetector for detecting a laser. If the laser is evenly distributed between the two photodetectors, then the laser position will be set as the correct position and a corresponding signal will be displayed. However, if the first photodetector detects more light than the second photodetector, then a signal will also be displayed to inform the user that more laser is being projected onto the first photodetector. On the other hand, if the second photodetector detects more light than the first photodetector, then a signal will be displayed to inform the user that more laser being projected onto the second photodetector. These signals will assist users to adjust the laser receiver to accurately position the laser.

Figure 1:
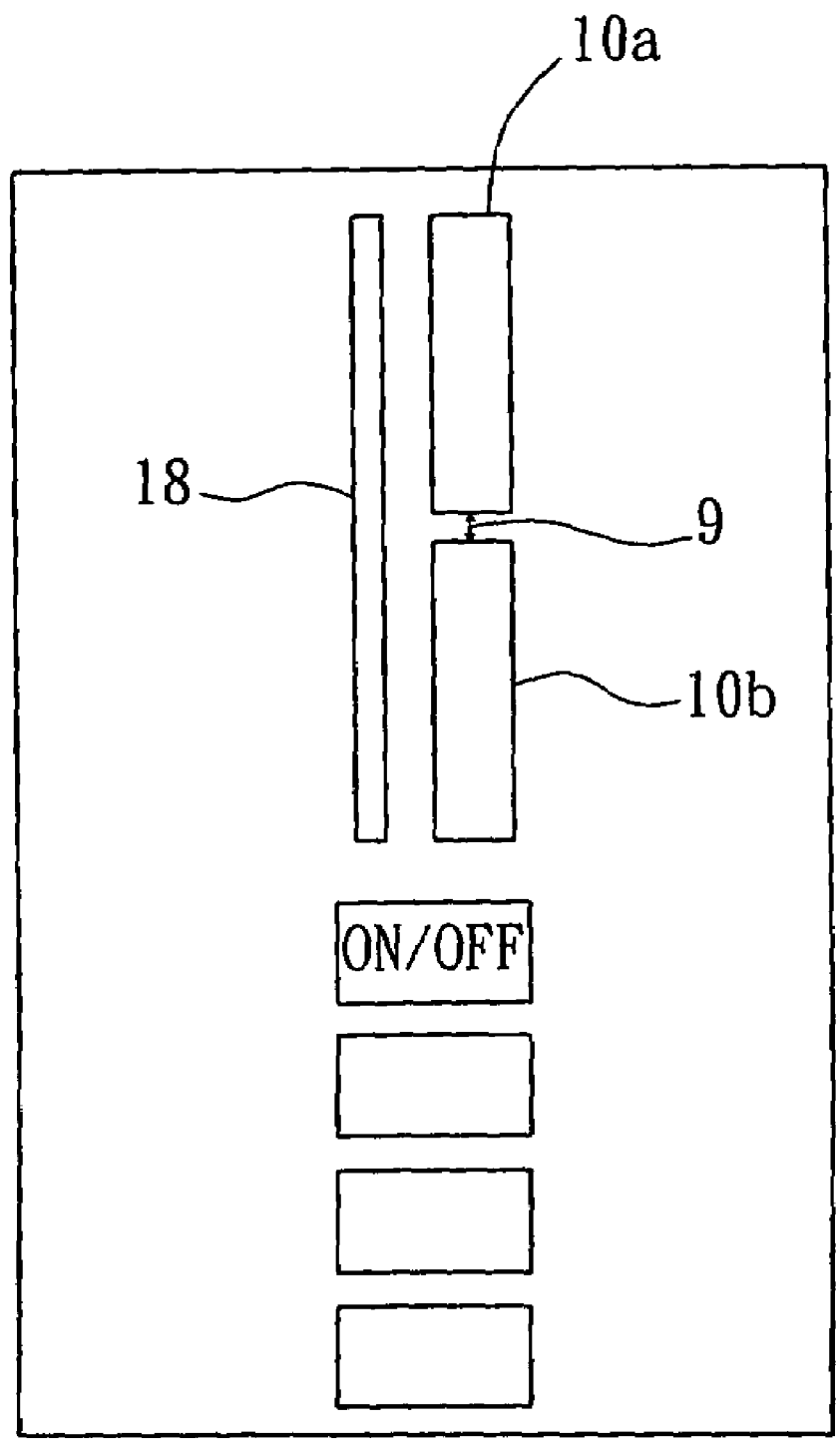
FIG. 1 illustrates a laser receiver according to one embodiment of the present invention
Figure 2:
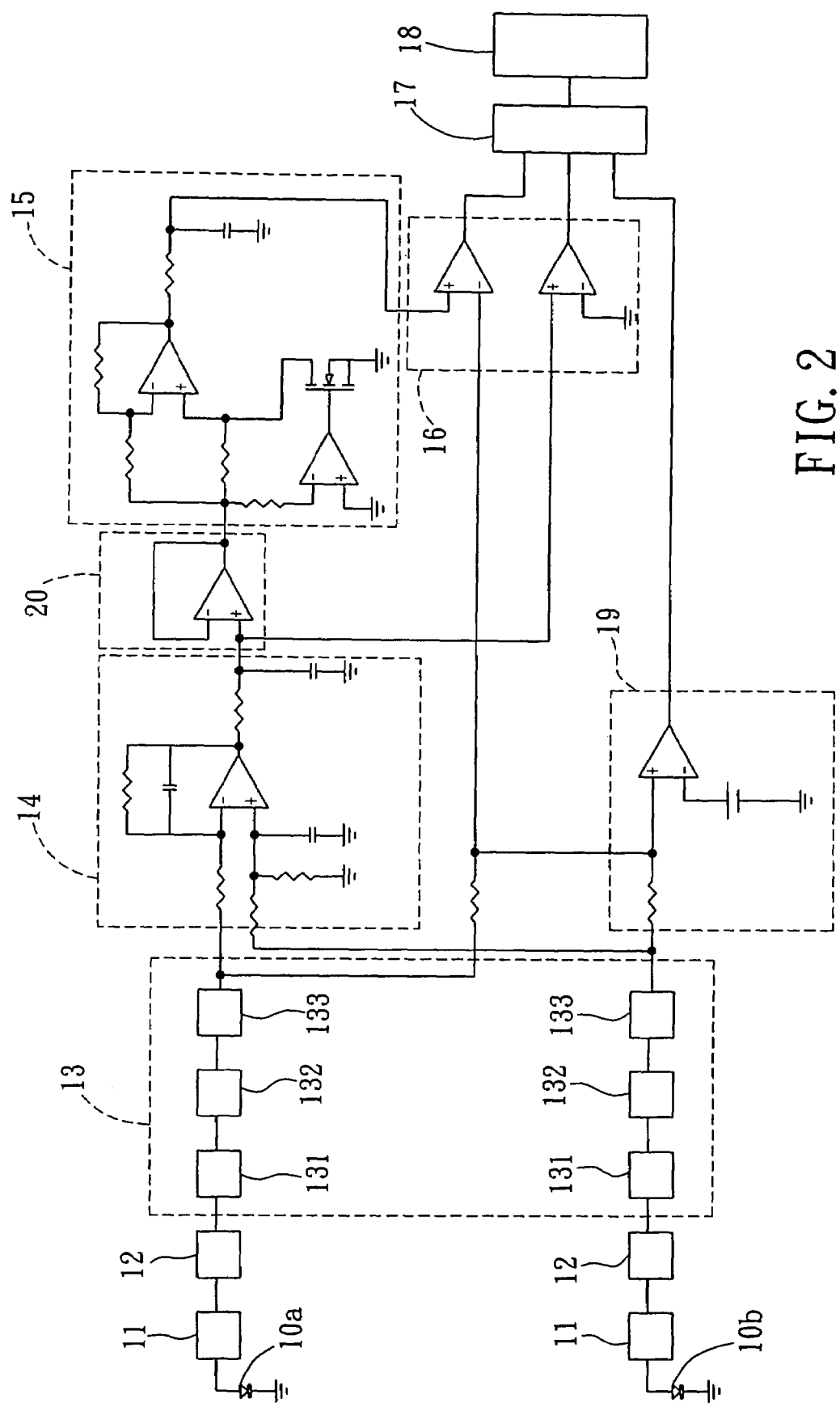
FIG. 2 is a circuit diagram of the laser receiver of FIG. 1.

FIG. 1 illustrates a laser receiver according to one embodiment of the present invention, and FIG. 2 illustrates a circuit diagram for the laser receiver of FIG. 1. The laser receiver of the present invention includes a first photodetector 10*a* and a second photodetector 10*b*, two band-pass filters 12, a signal processing unit 13, a differential amplifier 14, a voltage follower 20, an absolute value circuit 15, a compare circuit 16, a microprocessor 17, a display unit 18, and a laser detection comparator 19.

The first photodetector 10*a* and the second photodetector 10*b* are two photodetectors having identical rectangular shapes, and can be embodied in the form of photodiodes or devices using a solar cell for detection. Such devices have the advantage of greatly lowering cost. Other types of photodetectors known to those skilled in the art can also be used. The first photodetector 10*a* and the second photodetector 10*b* are aligned in series with each other and positioned so that there is a gap 9 (about 0.25 mm–0.5 mm) between the two photodetectors 10*a*, 10*b*. Each photodetector 10*a*, 10*b* is coupled to a separate voltage converter circuit 11. If the first photodetector 10*a* receives a first laser, then a first current signal corresponding to the intensity of the received first laser will be produced, and if the second photodetector 10*b* receives a second laser, then a second current signal corresponding to the intensity of the received second laser will be produced. Each voltage converter circuit 11 respectively coupled to the first photodetector 10*a* and the second photodetector 10*b* converts the first current and the second current into a first voltage signal and a second voltage signal, respectively. A band-pass filter 12 is coupled to each voltage converter circuit 11, and only allows the required signal to pass through while filtering all other unnecessary signals. A signal processing unit 13 is coupled to the band pass filters 12 and functions to amplify and rectify the first and second voltage signals to facilitate signal processing in the rest of the circuit.

The signal processing unit 13 includes an AC signal amplifier 131, a logarithm circuit 132, and a rectifier circuit 133 for each of the first and second voltage signals. The first and second voltage signals can fetch a voltage signal with a predetermined frequency from the band-pass filter 12, and then filter out the frequency of the unnecessary voltage signal. Since the voltage signal is very small at the time, the voltage signal is amplified by the alternate current signal amplifier 131, and the logarithm circuit 132 is used to logarithmically amplify the voltage signal. At this point, the voltage signal is in the form of an alternate current voltage signal having a positive or a negative value, and is rectified into a direct current voltage signal by the rectifier circuit 133 to produce a first direct current voltage signal and a second direct current voltage signal that correspond respectively to the first voltage signal and the second voltage signal.

The differential amplifier 14 is coupled to the signal processing unit 13 and functions to subtract the first direct current voltage signal from the second direct current voltage signal, with the resulting signal being amplified to produce a first difference. The voltage follower 20 is coupled to the differential amplifier 14 and serves as a partition to prevent the differential amplifier 14 from affecting the absolute value circuit 15. The absolute value circuit 15 is coupled to the voltage follower 20 and receives the first difference to produce a corresponding absolute value. The compare circuit 16 receives the absolute value as well as the first and second direct current voltage signals, and compares the absolute value difference with the sum of the first and second direct current voltage signals to produce a compare value. The microprocessor 17 is coupled to the compare circuit 16 and calculates the position of the laser according to the compare value, and displays the current laser position on a display unit 18 (see FIGS. 1 and 2). In this embodiment, the display unit 18 can be a liquid crystal display (LCD) or an indicator composed of a plurality of light emitting diodes (LEDs), or any other similar display devices known to those skilled in the art.

Thus, in the application of the laser receiver in accordance with the present invention, after the laser is projected onto the photodetectors 10a, 10b of the laser receiver, operations and computations are performed in the band-pass filter 12, signal processing unit 13, differential amplifier 14, voltage follower 20, absolute value circuit 15, compare circuit 16, and microprocessor 17, so that the laser position will be accurately displayed on the display unit 18.

Figure 3B:
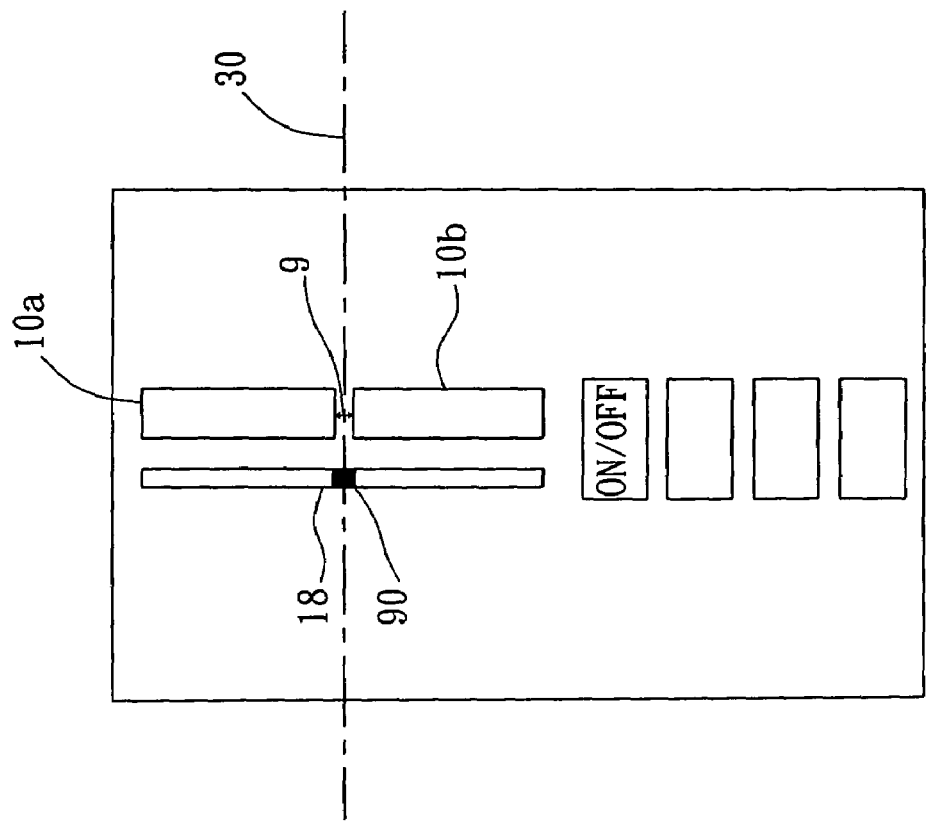
FIGS. 3A and 3B illustrate the operation of the laser receiver of FIG. 1.
Figure 3A:
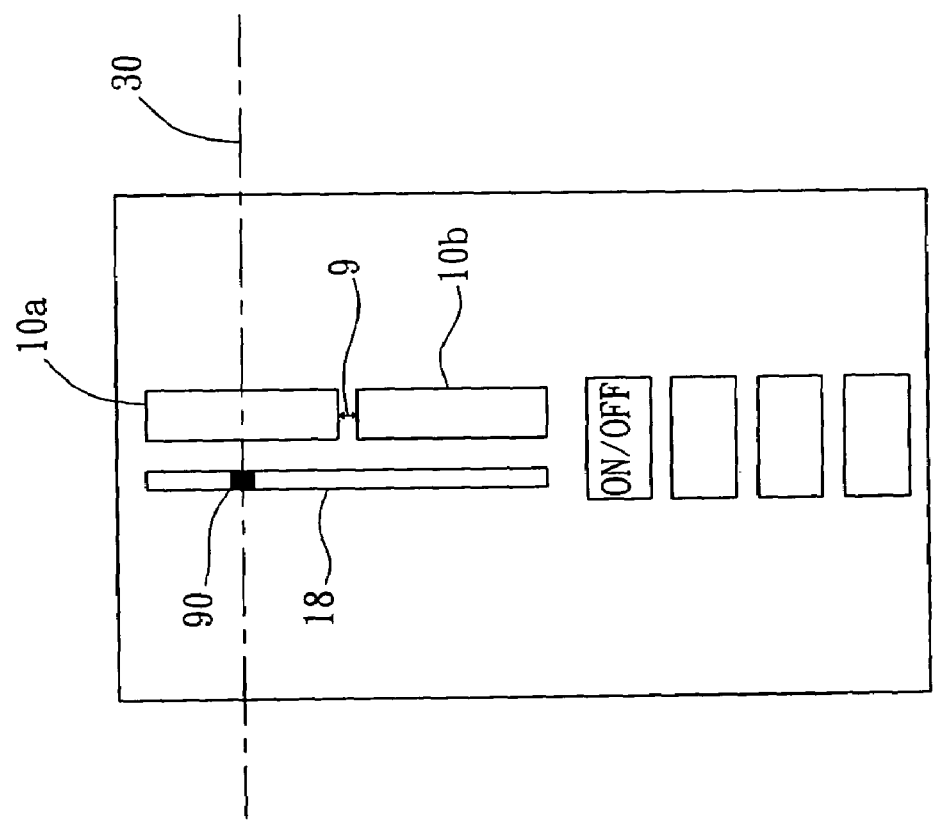

In FIG. 3A, the laser 30 is projected onto the first photodetector 10a, and a calibrated symbol 90 is marked at the corresponding position on the LCD display 18 to indicate the current position of the laser 30, so that the user can adjust the laser receiver according to the displayed signal. In FIG. 3B, if the laser 30 is projected onto the gap 9 between the first photodetector 10a and the second photodetector 10b, then the brightness of the laser 30 received by the two photodetectors 10a, 10b should be the same. Therefore, the display unit 18 will show a calibrated symbol 90 at a corresponding position on the display 18. In other words, if the laser 30 is projected onto the gap 9, the measured position is correct (as shown in FIG. 3B).

In addition, the detection comparator 19 is coupled to the signal processing unit 13 and fetches the sum of the first and second direct current voltage signals, and a predetermined value for the comparison. If the sum of the two direct current voltage signals is smaller than the predetermined value, then a signal will be sent to the microprocessor 17. If the microprocessor 17 receives this signal, then the current laser received by the laser receiver is not the correct one (e.g., the received light could be some external light other than the desired laser), and an invalid signal will be displayed on the display unit 18 to inform the user that the correct laser position has not been located. In addition, the microprocessor 17 will prevent the laser receiver from making a wrong decision or generating a wrong movement caused by the misleading external light.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A laser receiver for detecting the position of incidence of a beam of laser light thereon, comprising:
   a first photodetector and a second photodetector aligned in series with each other and spaced apart from each other by a gap, the first and second photodetectors detecting the radiation of the laser light to produce corresponding first and second current signals;
   a first voltage converter circuit coupled to the first photodetector, and a second voltage converter circuit coupled to the second photodetector, each voltage converter circuit separately receiving a corresponding one of the first and second current signals, and producing corresponding electronic signals;
   a first band-pass filter coupled to the first voltage converter circuit and a second band-pass filter coupled to the second voltage converter circuit, the band-pass filters filtering unnecessary electronic signals;
   a signal processing unit coupled to the first and second band-pass filters for amplifying and rectifying the electronic signals to produce corresponding first and second direct current voltage signals;
   a differential amplifier coupled to the signal processing unit and producing a difference corresponding to the first and second direct current voltage signals;
   an absolute value circuit coupled to the differential amplifier for producing an absolute difference corresponding to the difference;
   a compare circuit coupled to the absolute value circuit for comparing the absolute difference with the sum of the two direct current voltage signals to produce a compare value;
   a microprocessor coupled to the compare circuit for calculating the position of the laser light according to the compare value; and
   a display unit coupled to the microprocessor for displaying the position of the laser light.

2. The laser receiver of claim 1, further comprising a detection comparator coupled to the signal processing unit for fetching the first and second direct current voltage signals and a predetermined value,
   wherein if the first and second direct current voltage signals are smaller than the predetermined value, then the received laser light is determined to be an unwanted laser, and an invalid signal is generated.

3. The laser receiver of claim 2, wherein the microprocessor displays the invalid signal on the display unit.

4. The laser receiver of claim 1, further including a voltage follower positioned between the differential amplifier and the absolute value circuit to prevent the differential amplifier from affecting the absolute value circuit.

5. The laser receiver of claim 1, wherein the display unit is a liquid crystal display (LCD).

6. The laser receiver of claim 1, wherein the display unit is a light emitting diode (LED).

* * * * *